United States Patent

[11] 3,626,298

[72] Inventors T. O. Paine
Administrator of the National Aeronautics and Space Administration with respect to an invention of;
Tage O. Anderson, Arcadia; William J. Hurd, La Canada; William C. Lindsey, Highland, all of Calif.

[21] Appl. No. 839,934
[22] Filed July 8, 1969
[45] Patented Dec. 7, 1971

[54] TRANSITION TRACKING BIT SYNCHRONIZATION SYSTEM
20 Claims, 6 Drawing Figs.

[52] U.S. Cl. .......... 325/321, 178/69.5 R, 179/15 BS, 325/4, 325/38, 325/58, 343/6.5 LC
[51] Int. Cl. .......... H04b 7/18, H04b 7/20, H04l 7/02
[50] Field of Search .......... 325/4, 321, 39, 324, 58, 325, 38; 343/6.5 LC; 179/15 BS; 178/69.5 R

[56] References Cited

UNITED STATES PATENTS

| | | | |
|---|---|---|---|
| 3,320,611 | 5/1967 | Sekimoto | 343/6.5 LC |
| 3,349,328 | 10/1967 | Hunkins | 325/38 R |
| 3,384,823 | 5/1968 | Southworth | 325/38 R |
| 3,418,579 | 12/1968 | Hultberg | 325/4 |
| 3,430,237 | 2/1969 | Allen | 325/4 |

*Primary Examiner*—Benedict V. Safourek
*Assistant Examiner*—Howard W. Britton
*Attorneys*—J. H. Warden, Monte F. Mott and G. T. McCoy

ABSTRACT: A bit synchronization system, incorporating a digital data transition tracking phase-locked loop. The system, to which an input signal in the form of a noise-distorted constant amplitude bipolar stream of data bits, is assumed to be supplied, includes two integration channels. In one channel integrations are performed over assumed bit times, each bit time being equal to a bit period, while in the other channel integrations are performed over integration windows, each window being less than a bit period. The outputs of the two channels are combined to provide a pair of binary signals which are supplied to a digital filter, comprising a variable length counter and a variable gain register. The contents of two registers are combined to provide an error signal indicative of the direction of the phase difference between periods of bits in said stream and the assumed bit times.

TAGE O. ANDERSON
WILLIAM J. HURD
WILLIAM C. LINDSEY
*INVENTORS.*

BY

ATTORNEYS

TAGE O. ANDERSON
WILLIAM J. HURD
WILLIAM C. LINDSEY
INVENTORS.

BY G. J. McCoy / Monte F. Mott
ATTORNEYS

TAGE O. ANDERSON
WILLIAM J. HURD
WILLIAM C. LINDSEY
INVENTORS.

BY

ATTORNEYS

TAGE O. ANDERSON
WILLIAM J. HURD
WILLIAM C. LINDSEY
INVENTORS.

BY

ATTORNEYS

TAGE O. ANDERSON
WILLIAM J. HURD
WILLIAM C. LINDSEY
INVENTORS.

BY

ATTORNEYS

TRANSITION TRACKING BIT SYNCHRONIZATION SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention generally relates to digital data tracking circuitry and, more particularly, to a system for tracking digital data, in the form of binary numbers, present in a binary waveform with a very low signal-to-noise ratio (SNR).

2. Description of the Prior Art

The use of PSK/PCM techniques in data communication, particularly as related to telemetering data from space are well known in the art. Typically, in such a system, a subcarrier frequency is biphase modulated by a binary waveform, representing data in terms of ones and zeros. The subcarrier is assumed to be tracked by a phase-lock loop (PLL) in the receiver, wherein a local subcarrier frequency is available from a local subcarrier oscillator.

Under theoretical, ideal and noiseless conditions, data could be extracted by multiplying the received biphase modulated subcarrier frequency with the local subcarrier frequency and hard limiting the product. However, in practice, the ever present noise, whose effect increases with increased telemetry distances, prevents such simple data extraction. Under low signal-to-noise (S/N) conditions, the product signal is a noisy nonreturn to zero (NRZ) binary waveform, which contains a random sequence of zeros and ones.

To extract the zeros and ones from such a noise-distorted waveform, symbol or bit synchronization must first be performed in order to determine the location of each bit in the waveform. Once the bit location has been determined, each bit value in the waveform is determined by integrating over the bit period.

The performance of bit synchronization becomes particularly difficult at very low SNR conditions, which typify coded communications systems. In such systems SNR's of −5 db. to 0 db. are typical. Presently, commercially available PCM bit synchronizers are designed for operation above 0 db. and their inaccuracies cause degradations in average signal-to-noise ratio of about 1 db. Consequently, they cannot be employed in coded communication systems, wherein essentially perfect synchronization must be maintained in order to reap the full benefits that coding is capable of providing.

Other desired characteristics of a bit synchronizer include the capability of operation over a wide dynamic range of bit rates, such as from 5 bits per second (bps) to 250,000 bps. Selectable phase-locked loop bandwidths and extreme stability are also desired.

OBJECTS AND SUMMARY OF THE INVENTION

It is a primary object of the present invention to provide a new improved bit synchronization system based on the detection and tracking of transitions in the actual data waveform.

Another object is to provide an improved bit synchronization system for a communication system operating under low SNR conditions.

A further object is to provide a highly stable bit synchronization system for use in a communication system with SNR's of 0 db. and lower over a very wide range of data rates.

Still a further object of the invention is to provide a new highly stable bit synchronization system for use in a low SNR coded communication system, the synchronization system being characterized by wide dynamic range of bit rate operation and very low degradation, high stability and selectable loop bandwidth, ranging down to 0.001 percent of the bit rate.

These and other objects of the invention are achieved by providing a bit synchronization system which incorporates a phase-locked loop arrangement which responds to error signals generated as a function of signal integrations performed in two separate channels. One channel includes an integrator with an integration period equal to the bit period, while the other channel includes an integrator, whose integration period is only a fraction, generally less than one-half of the bit period.

The error signals are supplied to a digital loop filter which, due to its digital characteristics, eliminates instabilities, drifts, and leakage which occur in analog filters. Thus, high stability is achieved, enabling operation with extremely narrow loop bandwidths so that synchronization can be essentially perfect even at very low SNR's. Furthermore, the use of the digital filter makes the system bit rate independent, since the gain of the filter is proportional to the bit rate.

The output of the digital filter is converted to an analog error signal which is supplied to a voltage controlled oscillator (VCO), whose frequency output is used to control the beginnings and ends of the integration periods in the integrators in the two channels. The periods of the integrator which integrates over each bit period are forced to coincide with the time intervals over which individual bits are present.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
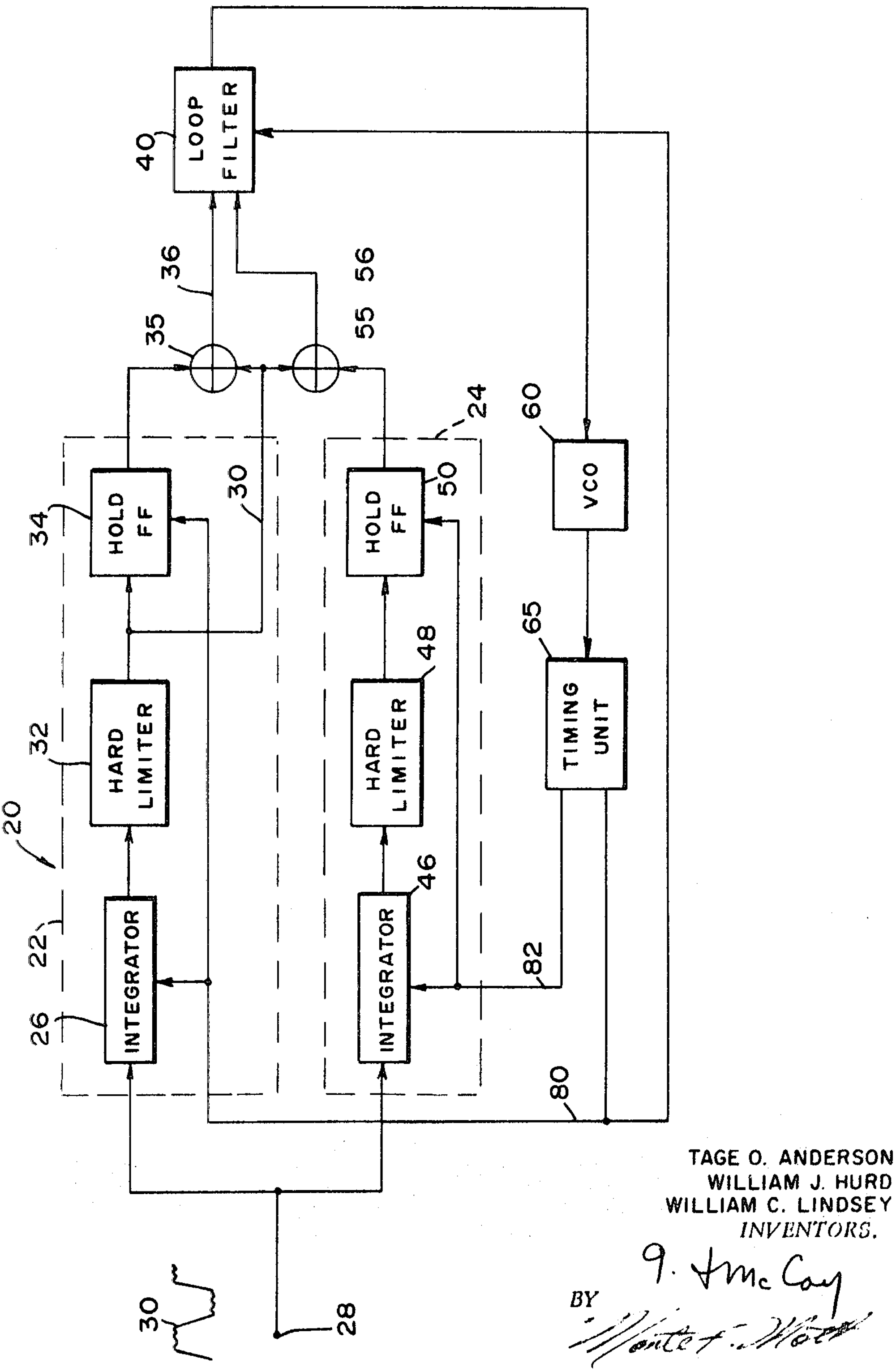
FIG. 1 is a basic block diagram of the system of the present invention.

Reference is now made to FIg. 1 which is a simplified diagram of the novel digital data tracking and synchronizing system of the present invention. Therein, the system is designated by numeral 20. The system includes a first channel 22, hereafter also referred to as the in-phase (IP) channel and a second channel 24, hereafter also referred to as the midphase (MP) channel. channel 22 includes an integrator 26, whose input is connected to the system's input terminal 28. A system input signal, in the form of a noisy binary waveform containing data as ones (1's) and zeros (0's) is assumed to be applied at terminal 28. Such a waveform is symbolically represented in FIG. 1 and designated by numeral 30. For explanatory purposes however, it will be helpful to ignore the noise effect and represent the system's input signal as having a nondistorted binary waveform.

The output of integrator 26 is supplied to a hard limiter 32, whose output is in turn supplied to a hold flip-flip 34. The outputs of limiter 32 and hold flip-flip 34 are supplied to input terminals of an exclusive OR-gate 35 whose output is supplied to a loop filter 40 via line 36. As will be pointed out hereafter, the output of the exclusive OR-gate 35 serves as a bit transition indication and, therefore, gate 35 may be referred to as the transition indicator.

Like in in-phase channel 22, midphase channel 24 also includes an integrator 46 which responds to the system's input signal at terminal 28 and integrates it during fixed defined integration periods. The output of integrator 46 is hard limited by a hard limiter 48, whose output is in turn supplied to a hold flip-flop 50. The output of flip-flop 50 and that of hard limiter 32 are supplied to two inputs of an exclusive OR-gate 55 whose output is supplied to the loop filter 40 via line 56.

As seen from FIG. 1, the system further includes a voltage control oscillator (VCO) 60 which is controlled by the output of the loop filter 40, while the VCO's output is supplied to control a timing unit 65. The outputs of unit 65 are used to control the integration periods of integrators 26 and 46, to clock flip-flops 34 and 50 and to clock the loop filter to control its operation as a function of the signals supplied thereto from gates 35 and 55.

Defining symbol duration or bit period in the system's input signals as T, the timing unit 65 controls the integrator 26 to perform integrations over assumed bit periods in the waveform, i.e., from $(n-1)$ T and $n$)T, where $(n-1)$T and $n$T represent assumed transition times. Consequently, the signs of the integrals from integrator 26 represent estimates of the data bits. In the midphase channel 24, the timing unit 65 controls integrator 46 to integrate the input signal during integration periods which are shorter than one bit period. The integration periods in the midphase channel may hereafter be referred to as integration windows, which are symmetric about the assumed transition times.

Whenever a transition occurs during the integration window, the midphase channel integral forms an estimate of the timing error between the actual transition time and the assumed transition time. In particular, whenever the actual transition occurs within the midphase window, the expected value of the integral of integrator 46 is proportional to the absolute value of the timing error. If, however, no transition is detected, the timing error estimate is assumed to be 0. For simplicity in the design of the loop filter 40, the timing error is quantized to one bit. When quantizing it to one bit, the timing error is made to be either a +1 or a −1 whenever a transition is detected, depending on the sign of the midphase integral and the direction of transition.

In the present invention, the sign of the midphase integral is provided by the hold flip-flop 50, the direction of transition by the output of hard limiter 32 and the presence or absence of a transition by the output of the transition indicator 35.

Figure 2:
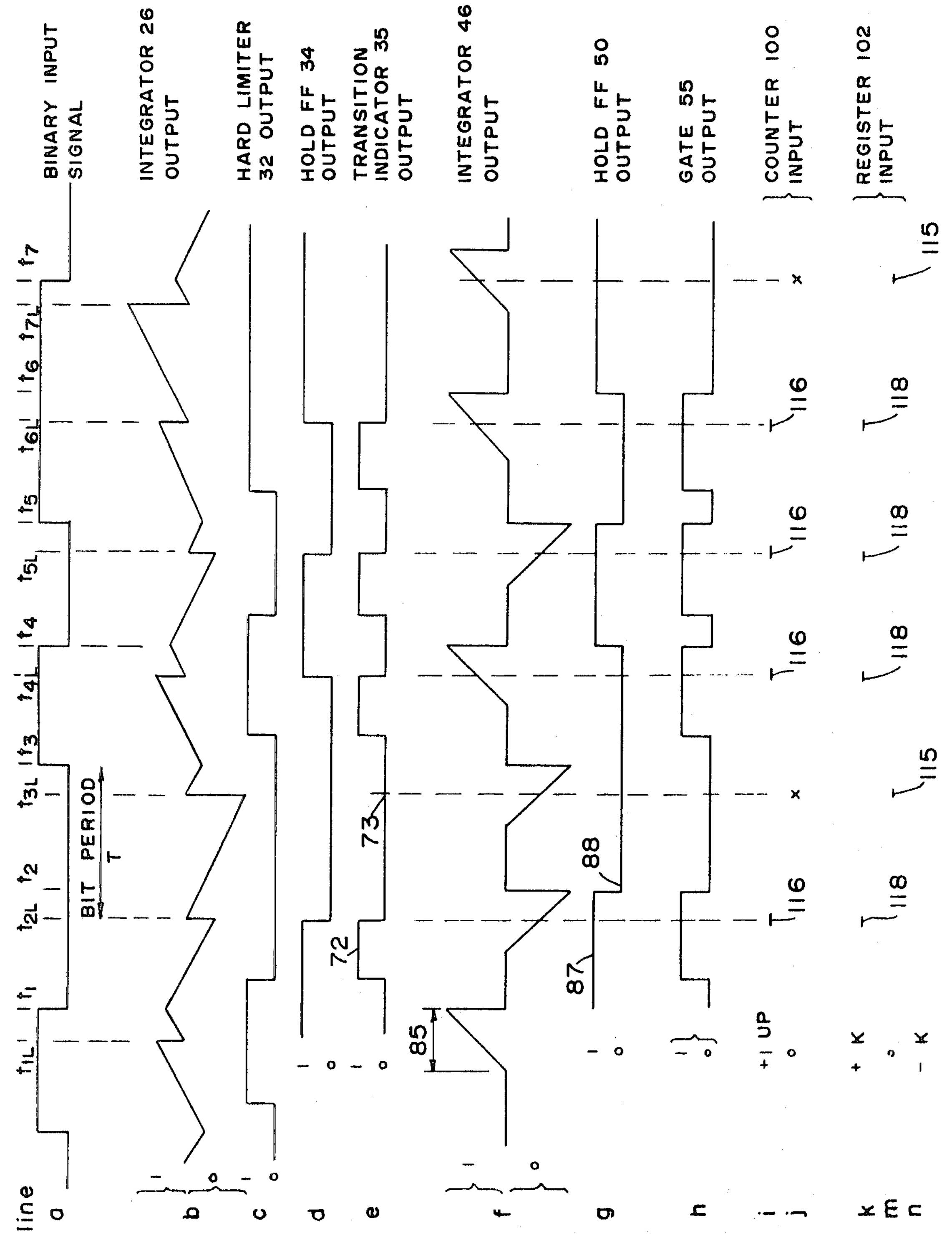
FIGS. 2, 3 and 4 are multiline waveform diagrams useful in explaining the basic principles of operation of the present invention.

The operation of system 20, shown in FIG. 1, may best be explained in conjunction with FIG. 2 in which the waveforms in lines *a* through *h* are used to represent the outputs of various ones of the circuits, hereinbefore referred to. For explanatory purposes, line *a* is used to diagram the system's input signal at terminal 28, from which the noise effect is removed. Line *b* represents the output of integrator 26, line *c* the output of hard limiter 32, line *d*, the output of hold flip-flop 34 and line *e*, the output of the exclusive OR gate or transition indicator 35. Line *f* is the waveform of the output of integrator 46 in the midphase channel 24, while line *g* represents the output of the hold flip-flop 50, whereas the output of the exclusive OR-gate 55 is diagrammed in line *h*.

In FIG. 2, $t_1$ through $t_7$ represent actual bit transition times of the input signal, thereby defining the actual locations of the various bits in the bit stream or input signal. For explanatory purposes, let it be assumed that the assumed transition times are ahead of the actual ones, with the assumed transition times being designated in FIG. 2 by $t_{1L}$ through $t_{7L}$. That is, each assumed transition time is ahead of the actual transition time. In accordance with the teachings of the present invention, timing unit 65 resets integrator 26 at each assumed transition time, such as $t_{1L}$, $t_{2L}$, etc. Between assumed transition times, the integrator 26 integrates the input signal and provides an output to the hard limiter 32. The latter is assumed to provide a positive output representing a binary 1 or 1 whenever the output of the integrator is positive, while providing a negative output representing a binary 0 whenever the integrator's output is negative.

During each assumed transition time, the hold flip-flop 34 is also clocked by the timing unit 65. The flip-flop is assumed to be set to a 1 state whenever the hard limiter's output is a 1 and to a 0 state whenever the limiter's output is 0. Assuming an input signal with a waveform as shown in line *a* of FIG. 2, it should be apparent from the foregoing description that at assumed transition of time $t_{1L}$, since the output of integrator 26 is positive, the hard limiter 32 provides a binary 1 output, which sets hold flip-flop 34 to a binary 1. Similarly, at assumed transition time $t_2$ since the integrator's output is negative, the hard limiter output is a 0, causing the flip-flop 34 to be reset to provide a binary 0 output.

The output of the limiter 32 and that of flip-flop 34 are supplied to the transition indicator 35. The latter provides an output which is the exclusive OR function of the two binary signals supplied thereto. This output is diagrammed in line *e* of FIG. 2. Briefly, at each assumed transition time, such as $t_{2L}$, the output of gate 35 is a binary 1, such as that designated by line 72, only if at the same assumed transition time ($t_{2L}$) the output of the integrator 26 has a polarity which is opposite its output polarity at the preceding assumed transition time. Thus, since at $t_{2L}$ the output of the integrator has a negative polarity and its preceding output at $t_{1L}$ was positive, the exclusive OR-gate 35 provides a true output at $t_{2L}$. On the other hand, if at two successive assumed transition times, the output of the integrator 26 is of the same polarity, such as occurs at $t_{2L}$ and $t_3$, when the output at each time is negative, the output of the transition indicator 35 is a binary 0, as represented by line 73. It should be pointed out, that the output of the transition indicator 35 is only of interest at the assumed transition times, when the loop filter 40 is assumed to be clocked by timing unit 65, which at the same time resets the integrator 26 and clocks the hold flip-flop 34.

While unit 65 resets the integrator 26 during each assumed transition time, by means of clocking or resetting signals, assumed to be supplied via line 80 (see FIG. 1), the timing unit 65 also controls the integration period of integrator 46 and the clocking of hold flip-flop 50 by means of clock signals supplied thereto via line 82. Briefly, the timing unit 65 defines a succession of integration periods or windows for integrator 46, each window being shorter than a bit period. In FIG. 2, the integration period is assumed to be half the bit period. Also, the integration period is controlled to start and end so that the assumed transition time is symmetric within the window. The integration window about assumed transition time $t_{1L}$ is designated in FIG. 2 by arrow 85.

At the end of each integration window, the polarity of the output of the integrator 46 is sensed by the hard limiter 48. The output of the latter is used to set or reset the hold flip-flop 50 which is clocked at the same time, depending on the polarity of the integral. Thus, as seen in line *g* of FIG. 2 at the end of integration window 85, since the integral output is positive, flip-flop 50 is assumed to be reset to a binary 1 state, as indicated by line 87. On the other hand, at the end of succeeding integration window, when the polarity of output of the integrator 46 is negative, the flip-flop 50 is reset to a binary 0, as represented by line 88.

As seen from FIG. 1, the output of the hold flip-flop 50 and that of hard limiter 32 are supplied to gate 55 which performs an exclusive OR function thereon. In FIG. 2, the output of the hard limiter is represented in line *c* and that of the hold flip-flop 50 in line *g*, whereas the output of the exclusive OR-gate 55 is represented in line *h*. For the particular waveform diagram, shown in FIG. 2, it should therefore be apparent that at $t_{2L}$, $t_{4L}$, $t_{5L}$ and $t_{6L}$, the output of the gate 55 is a binary 1, while being a binary 0 at $t_{3L}$ and $t_{7L}$. Basically the output of the hard limiter 32 which is supplied to gate 55 is a normalizing term to make the error voltage, represented by the polarity of the output of integrator 46 correct the timing error or phase in the proper direction independent on whether the transition is from a binary 0 to a binary 1, or from a binary 1 to a binary 1.

It should be pointed out, that whereas the hold flip-flops 34 and 50 may change state when properly clocked, the gates 35 and 55 are passive elements so that their outputs may change at any time, as a function of the two inputs supplied to each of them. However, for the purposes of the present invention their outputs are only significant during the assumed transition times, when the loop filter 40 is clocked thereby enabling it to respond to the outputs of the two gates.

Figure 3:
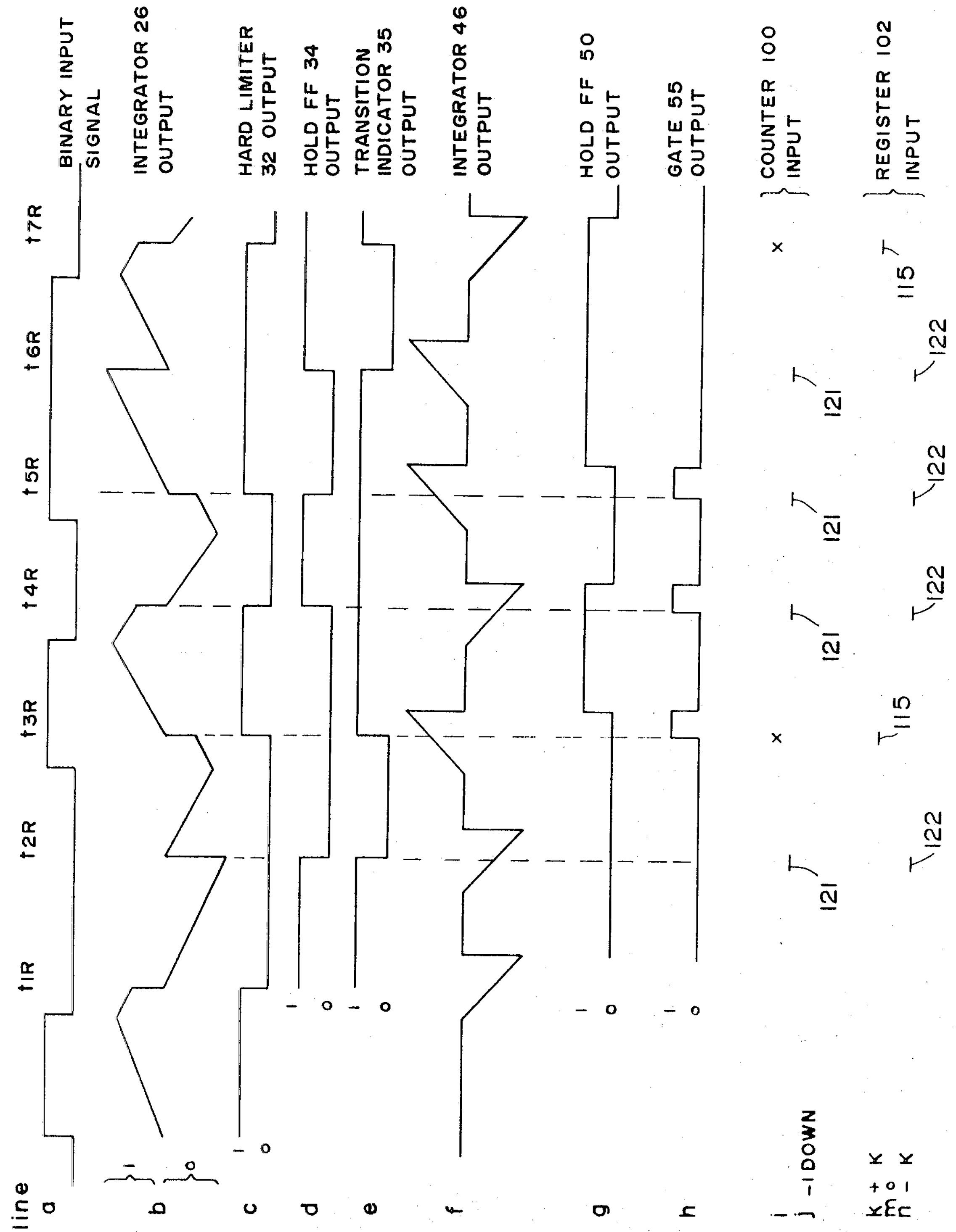

Reference is now made to FIG. 3 which is a multiline diagram similar to that of FIG. 2, except that in FIG. 3 the various waveforms and outputs of various circuits shown in FIG. 1 are represented for a condition for which each assumed transition time lags a corresponding actual transition time. It is for this reason that the assumed transition times are designated by the actual transition time designation followed by the letter R, such as for example $t_{1R}$, $t_{2R}$, etc.

From FIG. 3, line *h*, it should be apparent that during each of assumed transition times $t_{2R}$ through $t_{7R}$, the output of exclusive OR-gate 55 is a binary 0. The output of the transition indicator 35 is a binary 0 at assumed transition times $t_{3R}$ and $t_{7R}$, while being a binary 1 at transition times $t_{2R}$, $t_{4R}$, $t_{5R}$ and $t_{6R}$.

Figure 4:
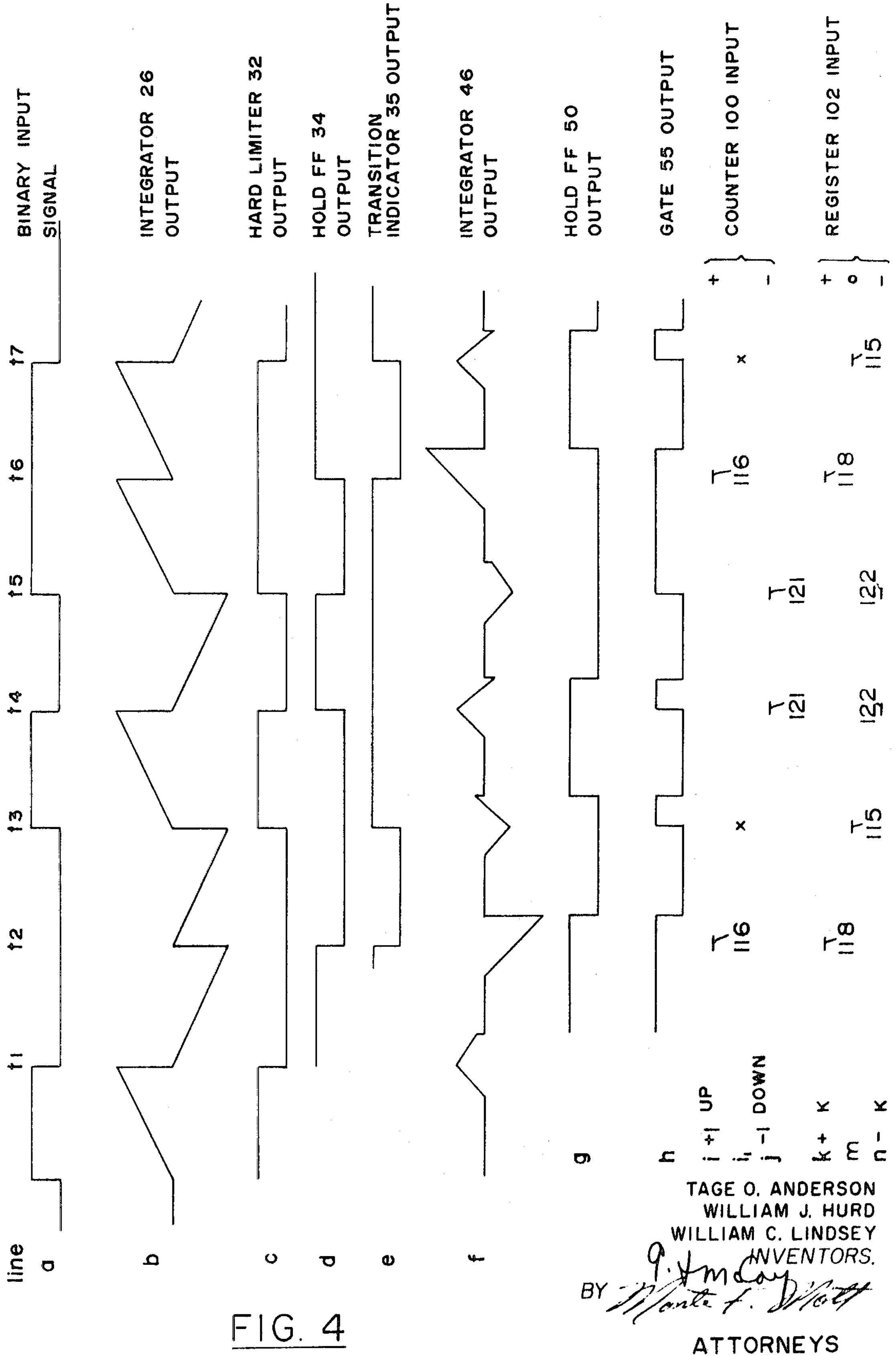

A similar multiline waveform diagram is shown in FIG. 4 to which reference is made herein. In the latter-mentioned figure, the various waveforms are shown for a condition in which the assumed transition times coincide with the actual transition times, i.e., a condition in which proper bit synchronization is achieved. In theory when bit synchronization is achieved if noise were not present the output of the integrator 46 at the end of each integration window which occurs when an actual bit transition is present, such as $t_1$, $t_3$, $t_4$, $t_5$ and $t_7$, should be zero.

However, due to the ever present noise this output would be other than zero. Yet, since the noise is assumed to be random, or Gaussian noise, the output polarity will be randomly distributed. For explanatory purposes the output at $t_1$ and $t_3$ shown as positive and at $t_4$, and $t_5$ and $t_6$ it is shown as negative.

Figure 5:
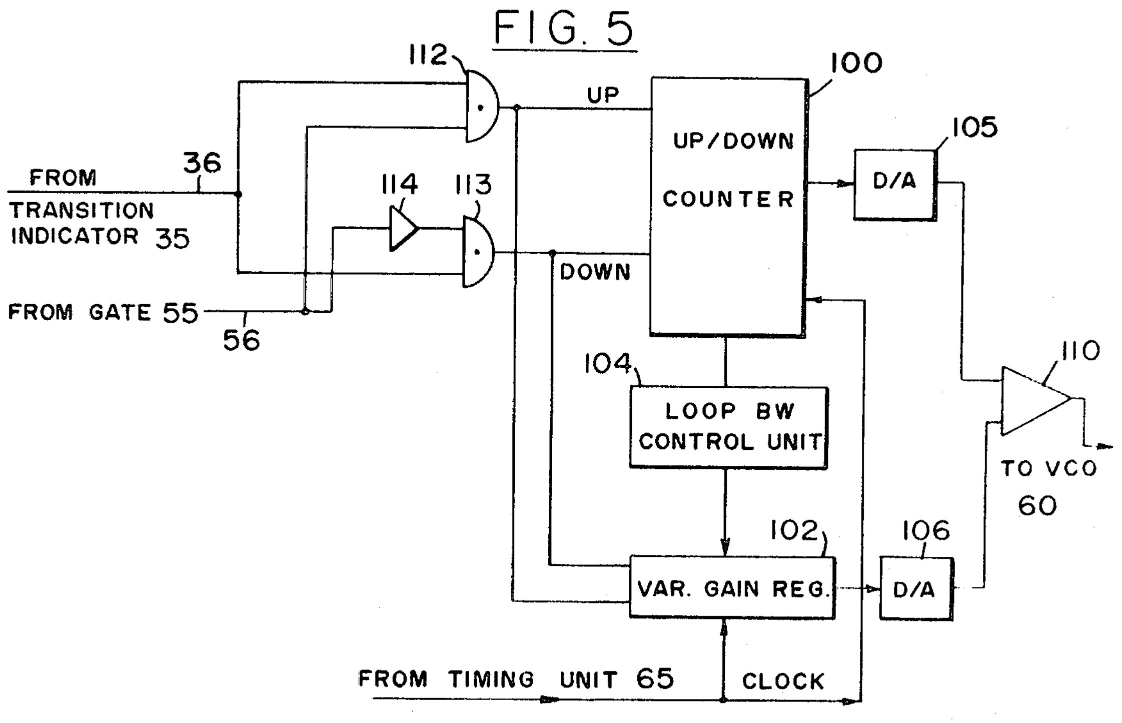
FIG. 5 is a block diagram of a novel digital loop filter 40, shown in FIG. 1.

Reference is now made to FIG. 5 which is a block diagram of the novel loop filter 40 to which the binary outputs of the gates 35 and 55 are supplied via lines 36 and 56, and whose output is supplied to the VCO 60, as shown in FIG. 1. Basically, the filter 40 includes a variable length up-down counter 100 and a variable gain register 102, both of which are controlled by a loop control unit 104. The digital output of counter 100 is converted into an analog signal, e.g., a voltage by a D/A converter 105, while a similar D/A converter 106 converts the digital output of register 102 into an analog voltage. The outputs of both converters 105 and 106 are supplied to an operational amplifier 110 whose output voltage is supplied to control the frequency of the VCO 60. The counter 100 and the register 102 are clocked during each assumed transition time by a clock signal from time unit 65, so that only at such assumed transition times can the content of either counter 100 or register 102 or both change as a function of the input signals, supplied thereto from gates 35 and 55.

The inputs of counter 100 and register 102 are connected to the outputs of two AND-gates 112 and 113. Line 36, representing the output of transition indicator 35, is directly connected to one input of each of the two latter-mentioned gates, while line 56, which is the output line of the gate 55, is shown connected directly to another input of AND-gate 112 and through an inverter 114 to the other input of AND-gate 113.

For explanatory purposes it is assumed that a true or binary 1 output of AND-gate 112 represents a count up signal, causing counter 100 to count up (at the clock time) while a binary 1 output of gate 113 represents a count down signal, causing the counter to count down. Clearly, when the output of neither gate is a binary 1, the count in the counter does not change. A 1 output of gate 112 is assumed to force a selected positive number, hereafter referred to as +K, into register 102, while selected negative number, hereafter referred to as −K, is forced into the register when gate 113 provides a true, binary 1 output. However, when neither gate is enabled to provide a true output, a third selected number, hereafter referred to as a 0 (zero) number is assumed to be forced into the register 102. Register 102 is assumed to include set gates so that when neither of their enable lines is true, the 0 number is forced thereinto.

From the foregoing it should be appreciated that at any assumed transition time when the counter and the register are clocked, the contents of the counter and/or register are subject to change, as a function of the binary outputs of both the transition indicator 35 and gate 55. If the output of the transition indicator 35 is a binary 0, as is the case at $t_{3L}$ or $t_{7L}$ (FIG. 2), neither AND-gate 112 nor gate 113 is enabled. Consequently, the content of the counter does not change. This is indicated by small *x*'s in line *j* of FIG. 2. However, a 0 number is forced into the register 102 as represented by the short lines 115 in line *m* of FIG. 2. However, if the output of the transition indicator 35 is a binary 1, one of gates 112 and 113 is enabled, which one depending on the output of gate 55. If the output of the latter is a 1, as is the case at transition times $t_{2L}$, $t_{4L}$ and $t_{6L}$ (FIG. 2), the counter is incremented each time, i.e., counts up as indicated by the short lines 116 in line *i* of FIG. 2. At the same time the +K number is forced into the register, as indicated by lines 118 in line *k* of FIG. 2. On the other hand, if when the output of transition indicator 35 is a binary 1, the output of gate 55 is a binary 0, which is assumed to occur at $t_{2R}$, $t_{4R}$, $t_{5R}$ and $t_{6R}$, for the waveforms shown in FIG. 3, gate 113 is enabled. Consequently, the counter 100 is supplied with count-down signals as indicated by lines 121 in line *j*, FIG. 3. Also, the −K number is forced into register 102, as indicated by lines 122 in line *n* FIG. 3. In FIG. 3, lines 115 represent 0 numbers forced into register 102 at times $t_{3R}$ and $t_{7R}$, when the output of transition indicator 35 is a binary 0.

On the other hand, as seen from FIG. 4, when bit synchronization is achieved, due to the random distribution of the noise, the polarity of the output of integrator 46 varies randomly between positive and negative, except when no transition is present as is the case at $t_2$ and $t_6$. Consequently, either gate 112 or 113 may be enabled causing the counter to count up or down. However, since the noise is Gaussion noise, once bit synchronization is achieved, the count in the counter will be relatively constant except for small up and down changes. Similarly +K numbers and −K numbers are randomly forced into the register 102.

In FIG. 4, like in FIg. 2, and FIG. 3, lines 116 designate count-up signals to the counter, lines 118 represent +K numbers forced into register 102. Also, lines 121 represent count-down signals to the counter and lines 115 and 122, respectively, represent 0 numbers and −K numbers which are forced into the register 102. It should be stressed that the actual values of the +K and −K numbers which are set or loaded into the register depend on the set gain of the register 102 which is controlled by the loop bandwidth control unit.

As seen from FIG. 5, the outputs of the counter and register are converted to analog form and are supplied to the amplifier 110, whose analog output is supplied to control the VCO 60. The output of the latter controls the timing unit thereby controlling the integration periods of the integrators and the clocking of the various circuits, as herebefore explained. Thus, the output of the amplifier 110 or the control of the VCO 60 depends on the contents of the counter 100 and register 102.

For the particular polarities, herebefore assumed, when the timing error is one in which the assumed transition times lead the actual transition times, as shown in FIG. 2, the count in counter 100 increases. On the other hand, when the timing error is one in which the assumed transition times lag the actual transition times, as shown in FIG. 3, the count in counter 100 decreases until lock or bit synchronization is achieved. When bit synchronization is achieved as assumed in FIG. 4, the count in counter 100 may increase or decrease, depending on the polarity of the output of the midphase channel integrator 46, due to the noise effect. However, since Gaussion noise is assumed, the count changes in either direction will be the same so that the count will remain relatively constant.

From the foregoing it is thus seen that the two channels 22 and 24, together with the transition indicator 35 and gate 55, provide two binary output signals which in essence represent the phase difference between the actual transition times and the assumed transition times. Thus, these units may be defined as a phase detector whose two outputs, on lines 36 and 56 are supplied to the loop filter 40. The loop filter together with VCO 60 is used to control unit 65 to control the integration periods of the integrators in the phase detector in order to obtain bit synchronization. Once synchronization is obtained, the system provides bit times which coincide with the actual bit periods of the input signal. Thus, the system maintains lock on the input signal.

For explanatory purposes, the two binary output signals of the phase detector may be thought of as representing a 0 output when the output of gate 35 is a binary 0, a +1 output when the outputs of both gates 35 and 55 are binary 1's and a −1 output when the outputs of gate 35 is a binary 1 and that of gate 55 a binary 0. Thus, a 0 output of the phase detector forces a 0 number into register 102. A +1 output acts as a count-up signal for the counter and a +K number is forced into the register 102. On the other hand, a −1 output from the phase detector acts as a count down signal for the counter and results in the forcing of −K number into the register 102.

The loop filter 40 (FIG. 5) may be defined as having a transfer function $$F(s)=K_1+(K_2/sI).$$

As previously explained, the two components of the loop filter output are generated in the digital domain in the counter 100 and register 102. These components are then converted by the D/A converters 105 and 106 to analog voltage which are summed in the operational amplifier 110.

The direct or first order component of the filter output, represented by the term $K_1$ in the above equation, is generated by setting register 102 to hold a +K, −K or 0 number, according to whether the phase detector output is +1, −1, or 0, and then converting it to an analog voltage. The second order component, represented by the term $K_2/sT$, is the running sum of the phase detector outputs. This summation is accomplished by the up/down counter 100, which acts as a perfect integrator. The factor 1/T arises because inputs to the filter occur every bit period, T.

The loop bandwidth is controlled by varying the two gains of the digital filter. Initial acquisition of bit sync may be achieved by increasing the gains $K_1$ and $K_2$, thus widening the loop bandwidth, and selecting the VCO center frequency such that the frequency error between the bit rate and the VCO frequency is less than the loop bandwidth. When bit lock is achieved, the loop bandwidth is narrowed to give better sync or tracking performance. Control of the gains $K_1$ and $K_2$ is entirely digital. $K_1$ is varied by changing the value of the register setting at the input to the direct path D/A. $K_2$ is varied by changing the number of stages in the up-down counter. Both of these changes which can be made while the loop is in lock are achieved by the loop bandwidth control unit 104.

From the foregoing it is seen that the novel system of the present invention is essentially digital except for the analog integrators 26 and 46, the operational amplifier 110 and the VCO 60. In particular, the loop filter 40, excluding the operational amplifier 110, is digital. Such an implementation eliminates instabilities, drifts and leakages which characterize analog filters. Thus, improved stability is achieved with the present invention. The improved stability makes possible extremely narrow loop bandwidths so that synchronization can be essentially perfect even at very low SNR's. Furthermore, by incorporating the loop bandwidth control unit 104 (FIG. 5) in the loop filter 40, the loop bandwidth may be selected, down to 0.001 percent of the bit rate. It should be pointed out that the system is rate independent, since the digital filter gains are proportional to the bit rate. The only limitations of the system are those posed by circuit speeds.

The foregoing described embodiment of the phase detector with a single integrator 26 in the in-phase channel 22 operates satisfactorily as long as the integrator's reset time is extremely small or insignificant, as compared with a bit period. If, however, the bit period is very short, for example, 4 μs, at a bit rate of 250,000 bits per second, so that the integrator's reset can no longer be regarded as insignificant, in order to insure that the integrated output represents the integration over a full bit period, it may be necessary to use two integrators, one of which is used to integrate over one bit period or time while the other is reset. Each integrator has to be followed by its own hard limiter and hold flip-flop, with time multiplexing being performed on the outputs of the two hard limiters and the two flip-flops.

Figure 6:
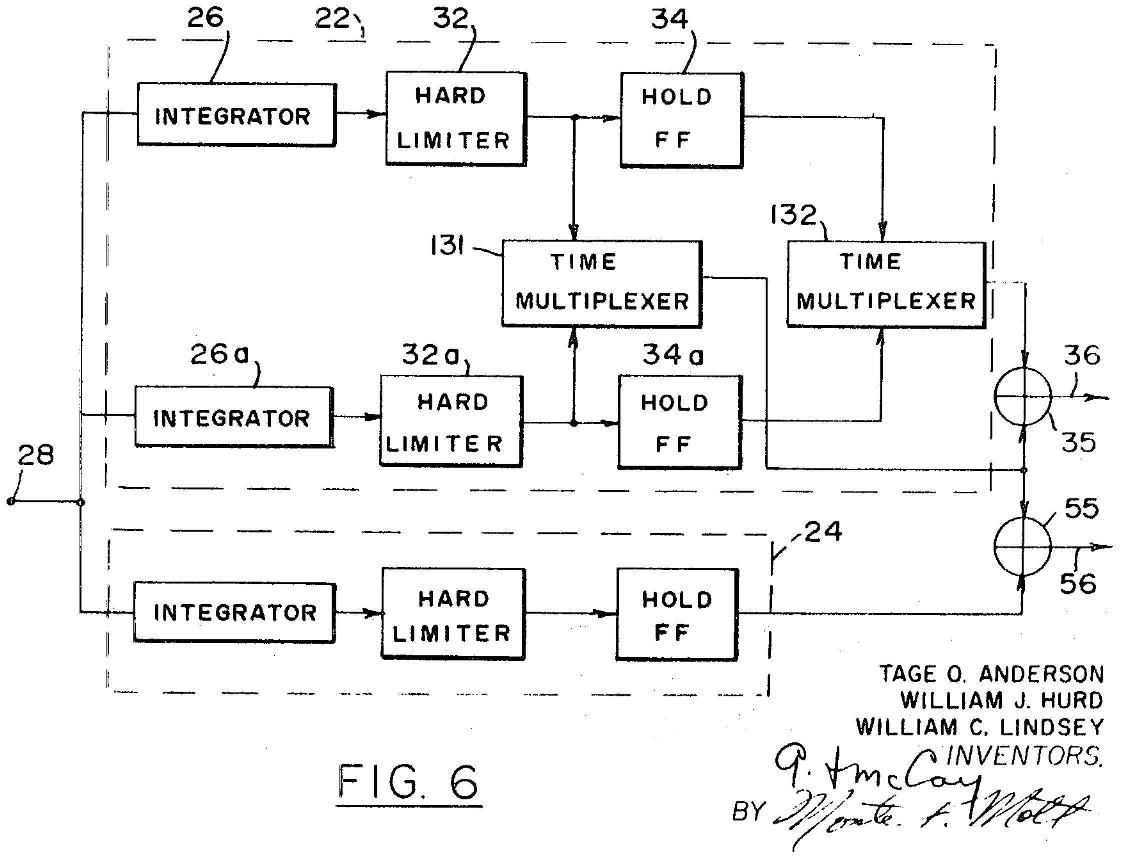
FIG. 6 is a block diagram of another embodiment of a phase detector forming a basic part of the novel system of the present invention.

Such an embodiment of the phase detector is shown in FIG. 6, to which reference is now made. As shown the in-phase channel 22, in addition to including integrator 26, hard limiter 32 and hold flip-flop 34, include a second integrator 26*a*, a second hard limiter 32*a* and a second hold flip-flop 34*a*. Also included are two time multiplexers 131, 132. Multiplexer 131 multiplexes the outputs of the hard limiters and provides an output which is supplied to the two gates 35 and 36. This output corresponds to the output of hard limiter 32 in FIG. 1. Similarly, multiplexer 132 multiplexes the outputs of the hold flip-flops and supplies an output to gate 35, which corresponds to the output of flip-flop 34 in FIG. 1. Thus, time multiplexing is digital.

In practice, during one assumed bit time one integrator such as 26, integrates the input signal and the other integrator is reset. Then, at the end of the period, at an assumed transition time, integrator 26 is reset and integrator 26*a* integrates the input signal over the next assumed bit period. Also, at the assumed transition time the multiplexers 131 and 132 supply to the gates 35 and 55 the outputs of the hard limiter 32 and flip-flop 34 as shown. Then, at the next assumed transition time it is the outputs of the limiter 32*a* and 34*a* which multiplexers 131 and 132, respectively, supply to the gates 35 and 55.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A bit synchronization system comprising:

first means for receiving an input signal in the form of a noise-distorted constant amplitude bipolar stream of bits, each bit being of a fixed bit period;

phase detector means including first integrating means for successively integrating said input signals over integration periods, each equal to said bit period, and second integrating means for successively integrating said input signal over integration periods, each less than said bit period, the start of each integration period of said first integrating means being symmetrical about an integration period of said second integrating means, said phase detecting means further including combining means responsive to the outputs of said first and second integrating means for providing first and second binary output signals, the combination of which is indicative of the phase difference between the integration periods of said first integration means and the periods of actual bits in said input signal;

timing means for controlling the integrations of said first and second integrating means; and loop control means responsive to said first and second binary output signals from said phase detector means for controlling said timing means so as to minimize said phase difference.

2. A bit synchronization system as described in claim 1 wherein the integration period of said second integrating means is not more than one half bit period.

3. A bit synchronization system as described in claim 1 wherein said first binary output signal is a function of the polarities of the output signals of said first integrating means at the end of two successive integrating periods thereof, and said second binary output signal is a function of the polarities of the output signal of said first and second integrating means, and wherein said loop control means includes filter means clockable by said timing means at the start of each integration period of said first integrating means to respond to said first and second binary output signals of said phase detector means.

4. A bit synchronization system as described in claim 3 wherein said filter means includes an up-down counter and register means clockable by said timing means at the start of each integration period of said first integrating means and input means for changing the count in said counter only when said first binary output signal is indicative of a reversal in the polarities of the output signal of said first integrating means at the ends of two successive integration periods thereof, said input means being responsive to said first and second binary output signals for loading one of three different numbers into said register means as a function of said first and second binary output signals, said filter means further including analog means for providing an analog phase-difference-indicating signal as a function of the count in said counter and the number in said register means.

5. A bit synchronization system as described in claim 4 wherein said loop control means include a voltage controlled oscillator responsive to said analog phase-difference-indicating signal for providing signals at a frequency which is a function thereof, and means for supplying the signals provided by said voltage controlled oscillator to said timing means to control the starts and ends of the integration periods of said first and second integrating means.

6. A bit synchronization system as described in claim 5 wherein said counter is a variable length up-down counter and said register means is a variable gain register and said filter means include loop bandwidth control means for selectively controlling the length and gain of said counter and register, respectively.

7. A bit synchronization system as described in claim 6 wherein the integration period of said second integrating means is not more than one-half bit period.

8. A bit synchronization system comprising:

first means for receiving an input signal in the form of a noise-distorted constant amplitude bipolar stream of bits, each bit being of a fixed bit period;

phase detector means including a first integration channel which includes a first integrator controlled to integrate over each integration period equal to a bit period said input signal over each assumed bit time, a first polarity sensor for indicating at the end of each integration period the polarity of the integral of the input signal provided by said first integrator and first hold means for indicating the polarity of the integral at the end of a previous integration period, said phase detector means further including a second integration channel which includes a second integrator controlled to integrate the input signal over integration periods each being less than said bit period, with the start of each integration period of said first integrator being symmetrical about an integration period of said second integrator, said second integration channel further including second hold means setable at the end of each integration period of said second integrator to a state which is indicative of the polarity of the integral provided by said second integrator, said phase detector means further including first and second gate means to which the outputs of said first polarity sensor and said first and second hold means are supplied for providing first and second binary output signals, the combination of which is indicative of the phase difference between the assumed bit times and the bits in said stream of bits comprising said input signal;

timing means for controlling the starts and ends of the integrations of said first and second integrators; and closed loop control means responsive to said first and second binary output signals for controlling said timing means to vary the starts and ends of the integrations of said first and second integrators so as to minimize said phase difference.

9. The arrangement as recited in claim 8 wherein the integration period of said second integrator is not more than one-half bit period.

10. A bit synchronization system as described in claim 8 wherein said first binary output signal is a function of the polarities of the output signals of said first polarity sensor and said first hold means, and said second binary output signal is a function of the polarities of the output signal of said first polarity sensor and said second hold means, and wherein said closed loop control means includes filter means clockable by said timing means at the start of each integration period of said first integrator to respond to said first and second binary output signals of said phase detector.

11. A bit synchronization system as described in claim 10 wherein said filter means include an up-down counter and register means clockable by said timing means at the start of each integration period of said first integrator, and input means for changing the count in said counter only when said first binary output signal is indicative of a reversal in the polarities of the output signal of said first integrating means at the ends of two successive integration periods thereof, said input means responsive to said first and second binary output signals for loading one of three different numbers into said register means as a function of said first and second binary output signals, said filter means further including analog means for providing an analog phase-difference-indicating signal as a function of the count in said counter and the number in said register means.

12. A bit synchronization system as described in claim 11 wherein said closed loop control means include a voltage controlled oscillator responsive to said analog phase-difference-indicating signal for providing signals at a frequency which is a function thereof, and means for supplying the signals provided by said voltage controlled oscillator to said timing means to control the starts and ends of the integration periods of said first and second integrators.

13. The arrangement as recited in claim 12 wherein the integration period of said second integrator is not more than one-half bit period.

14. A bit synchronization system as described in claim 11 wherein said counter is a variable length up-down counter and said register means is a variable gain register and said filter means include loop bandwidth control means for selectively controlling the length and gain of said counter and register, respectively.

15. A bit synchronization system as described in claim 14 wherein said closed loop control means include a voltage controlled oscillator responsive to said analog phase-difference-indicating signal for providing signals at a frequency which is a function thereof, and means for supplying the signals provided by said voltage controlled oscillator to said timing means to control the starts and ends of the integration periods of said first and second integrators.

16. The arrangement as recited in claim 15 wherein the integration period of said second integrator is not more than one-half bit period.

17. In a bit synchronization system of the type receiving an input signal in the form of a noise-distorted constant amplitude bipolar stream of data bits, each bit being of a fixed period, the system including means for automatically determining the location of each bit in said stream by integrating over assumed bit times to develop phase-difference-indicating signals and further including closed loop control means responsive to said phase-difference-indicating signals for varying the starts of said assumed bit times to coincide with the bit periods of said data bits in said stream the improvement comprising:

a first integration channel including a first integrator for integrating the input signal over each assumed bit time, equal to a bit period, said first channel including means for providing a first binary signal at the end of each integration period which is indicative of the polarity of the integral of said first integrator, and a second binary signal which is indicative of the polarity of the integral of said first integrator at the end of a preceding integrating period thereof;

a second integration channel including a second integrator for integrating the input signal over an integration window of a duration less than one bit period, with the start of each integration period of said first integrator being symmetrical in a corresponding integration window, said second channel including means for providing a third binary output signal indicative of the polarity of the integral of the second integrator at the end of the last integration window; and gating means responsive to said first, second and third binary output signals for providing fourth and fifth binary output signals the combination of which is indicative of the direction of the phase-difference-between said assumed bit times and the periods of said data bits in said stream of bits.

18. The arrangement as recited in claim 17 wherein each integration window is not more than one-half bit period.

19. The arrangement as recited in claim 17 wherein said closed loop control means include a digital filter comprising an up/down counter whose count is controlled as a function of said fourth and fifth binary output signals at the start of each assumed bit time, and a register for storing one of three numbers as a function of the binary combination of said fourth and fifth binary output signals, and analog means for providing a phase-difference-indicating signal as a function of the numbers in said counter and register.

20. The arrangement as recited in claim 19 wherein said gating means comprise first and second Exclusive-OR gates whose outputs comprise said fourth and fifth binary output signals, respectively, and wherein each integration window is not more than one-half bit period.

* * * * *